US011959389B2

(12) United States Patent
Bisson et al.

(10) Patent No.: US 11,959,389 B2
(45) Date of Patent: Apr. 16, 2024

(54) TURBINE SHROUD SEGMENTS WITH ANGULAR LOCATING FEATURE

(71) Applicant: PRATT & WHITNEY CANADA CORP., Longueuil (CA)

(72) Inventors: Jocelyn Bisson, St-Basile-le-Grand (CA); Guy Lefebvre, St-Bruno-de-Montarville (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 173 days.

(21) Appl. No.: 17/345,017

(22) Filed: Jun. 11, 2021

(65) Prior Publication Data

US 2022/0397041 A1 Dec. 15, 2022

(51) Int. Cl.
*F01D 25/24* (2006.01)

(52) U.S. Cl.
CPC .......... *F01D 25/24* (2013.01); *F05D 2220/32* (2013.01)

(58) Field of Classification Search
CPC ............................. F01D 25/24; F05D 2220/32
USPC .......................................................... 415/196
See application file for complete search history.

(56) References Cited

U.S. PATENT DOCUMENTS 5,927,942 A * 7/1999 Stahl ....................... F01D 11/08 415/115
6,814,538 B2 * 11/2004 Thompson .............. F01D 11/08 415/173.1
6,884,026 B2 * 4/2005 Glynn ....................... F02C 7/20 415/113
7,338,253 B2 * 3/2008 Nigmatulin ............... F02C 7/28 415/139
8,079,807 B2 * 12/2011 Shapiro ................... F01D 11/12 415/173.1
9,133,732 B2 * 9/2015 Afanasiev ............... F01D 9/042
9,518,474 B2 * 12/2016 Shapiro .................... F01D 11/18
10,378,386 B2 * 8/2019 Roussille .............. F01D 11/025
2009/0053050 A1 * 2/2009 Bruce ................... F01D 25/246 415/200
2016/0017750 A1 * 1/2016 Lefebvre ................. F01D 11/24 415/175

(Continued)

FOREIGN PATENT DOCUMENTS

EP 0967364 A1 12/1999
EP 3739168 A1 11/2020

(Continued)

OTHER PUBLICATIONS

European Search Report issued in counterpart U.S. Appl. No. 22/178,750 dated Nov. 7, 2022.

*Primary Examiner* — Hung Q Nguyen
*Assistant Examiner* — Anthony Donald Taylor, Jr.
(74) *Attorney, Agent, or Firm* — NORTON ROSE FULBRIGHT CANADA LLP.

(57) ABSTRACT

A turbine shroud segment has a shroud body including a platform having forward and aft hooks extending from a radially outer surface of the platform for engagement with a shroud support structure of a turbine support case. A pin receiving hole is defined in the shroud body. An anti-rotation pin is engaged in the pin receiving hole. The anti-rotation pin projects outwardly from the pin receiving hole for engagement with a corresponding anti-rotation abutment on the shroud support structure.

13 Claims, 4 Drawing Sheets

(56) References Cited

U.S. PATENT DOCUMENTS

| | | | | |
|---|---|---|---|---|
| 2016/0169037 | A1* | 6/2016 | Lefebvre | F01D 11/005 415/1 |
| 2017/0016341 | A1* | 1/2017 | Stapleton | F02C 3/04 |
| 2018/0016943 | A1* | 1/2018 | Lefebvre | F01D 25/243 |
| 2018/0073379 | A1* | 3/2018 | Lefebvre | F01D 11/005 |
| 2018/0073398 | A1* | 3/2018 | Quennehen | F01D 25/28 |
| 2019/0383159 | A1* | 12/2019 | Langer | F16B 41/002 |
| 2021/0189897 | A1* | 6/2021 | Sippel | F01D 11/08 |

FOREIGN PATENT DOCUMENTS

| | | | | |
|---|---|---|---|---|
| EP | 3828391 | A1 | 6/2021 | |
| EP | 3828391 | A2 * | 6/2021 | F01D 11/005 |
| FR | 3059323 | A1 * | 6/2018 | C04B 37/025 |
| FR | 3059323 | A1 | 6/2018 | |

* cited by examiner

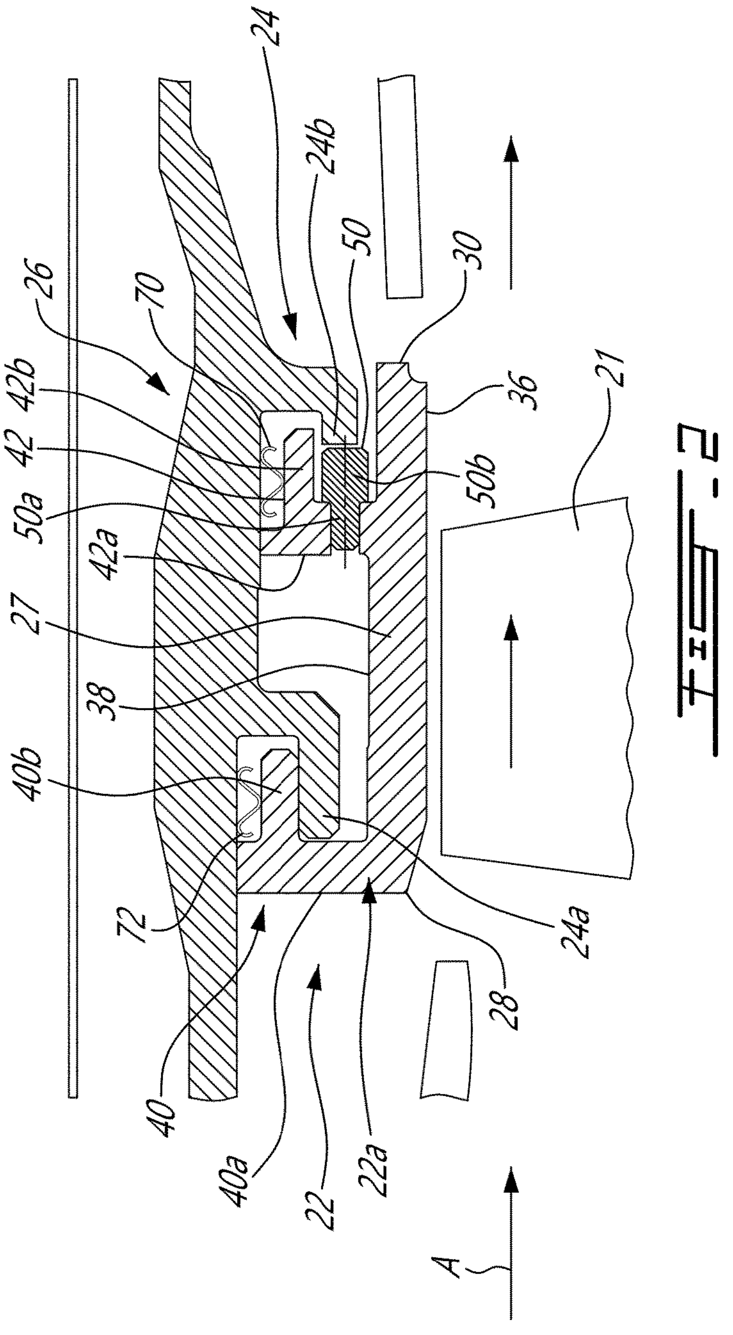
24
24b
50
30
26
70
42b
42
50a
42a
27
38
40b
72
40
40a
22
22a
28
24a
36
50b
21
A
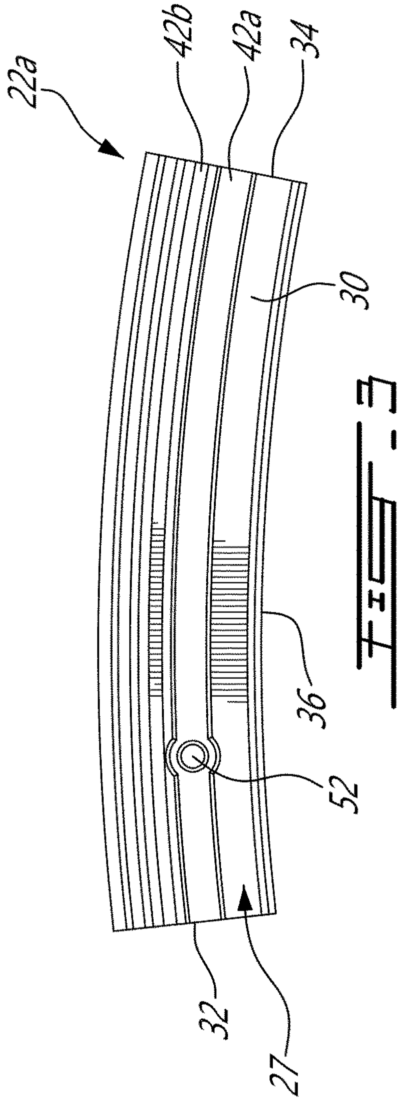
22a
42b
42a
34
30
36
52
32
27

TURBINE SHROUD SEGMENTS WITH ANGULAR LOCATING FEATURE

TECHNICAL FIELD

The application relates generally to gas turbine engines and, more particularly, to turbine shrouds.

BACKGROUND OF THE ART

Turbine shrouds are radially located on a turbine support case (TSC) about the tip of the turbine blades to control blade tip clearance. The turbine shrouds are typically segmented in the circumferential direction to allow for thermal expansion. While various framework have been developed for supporting the shroud segments in position in the turbine case, continued improvements are suitable.

SUMMARY

In one aspect, there is provided a turbine shroud segment of a circumferentially segmented turbine shroud configured to be mounted inside a turbine support case for surrounding a circumferential array of turbine blades rotatable about an axis, the turbine shroud segment comprising: a shroud body including: a platform having a radially inner surface facing towards the axis and a radially outer surface facing away from the axis; forward and aft hooks extending from the radially outer surface of the platform and configured for engagement with a shroud support structure on the turbine support case; and a pin receiving hole defined in the shroud body; and an anti-rotation pin engaged in the pin receiving hole, the anti-rotation pin projecting outwardly from the pin receiving hole for engagement with a corresponding anti-rotation abutment on the shroud support structure.

In another aspect, there is provided a turbine section comprising: a turbine support case extending circumferentially around an axis; a circumferential array of turbine blades disposed within the turbine support case for rotation about the axis; and a circumferentially segmented turbine shroud mounted inside the turbine support case about the circumferential array of turbine blades, the circumferentially segmented turbine shroud including a plurality of shroud segments disposed circumferentially one adjacent to another, each shroud segment having a body including: a platform having a radially inner surface facing towards the axis and a radially outer surface facing away from the axis; and forward and aft hooks extending radially outwardly from the radially outer surface of the platform for engagement with a shroud support structure on the turbine support case; wherein one or more of the plurality of shroud segments have a pin receiving hole defined in the body thereof; and wherein an anti-rotation pin has a first end engaged in the pin receiving hole and a second end received in a localisation slot defined in the shroud support structure of the turbine support case.

In a further aspect, there is provided a turbine shroud assembly comprising: a shroud support extending circumferentially around an axis; and a circumferentially segmented turbine shroud supported by the shroud support, the circumferentially segmented turbine shroud including a plurality of shroud segments, each shroud segment having: a platform; a pair of axially spaced-apart hooks projecting radially outwardly from a radially outer surface of the platform, each hook of the pair of axially spaced-apart hooks having a radially extending leg portion and an axially extending rail portion; a pin receiving hole extending through the radially extending leg portion of one of the axially spaced-apart hooks; and a pin removably installed in the pin receiving hole.

DESCRIPTION OF THE DRAWINGS

Reference is now made to the accompanying figures in which:

FIG. 2 is an axial cross-section of a turbine shroud segment supported by a surrounding shroud support of a turbine case of the engine shown in FIG. 1, FIG. 3 is an aft end view of the shroud segment;

DETAILED DESCRIPTION

Figure 1:
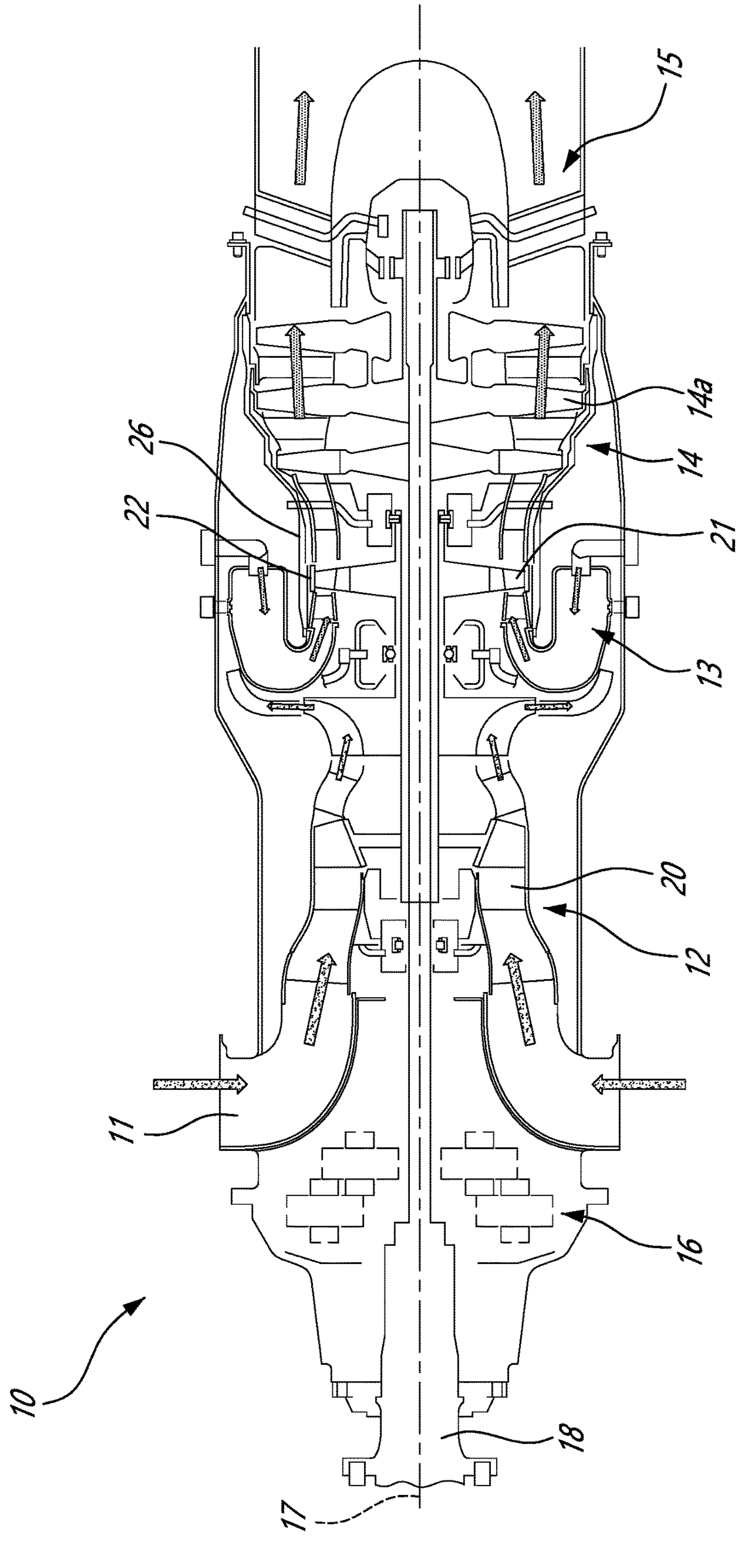
FIG. 1 is a schematic cross-sectional view of a gas turbine engine.
Figure 5:
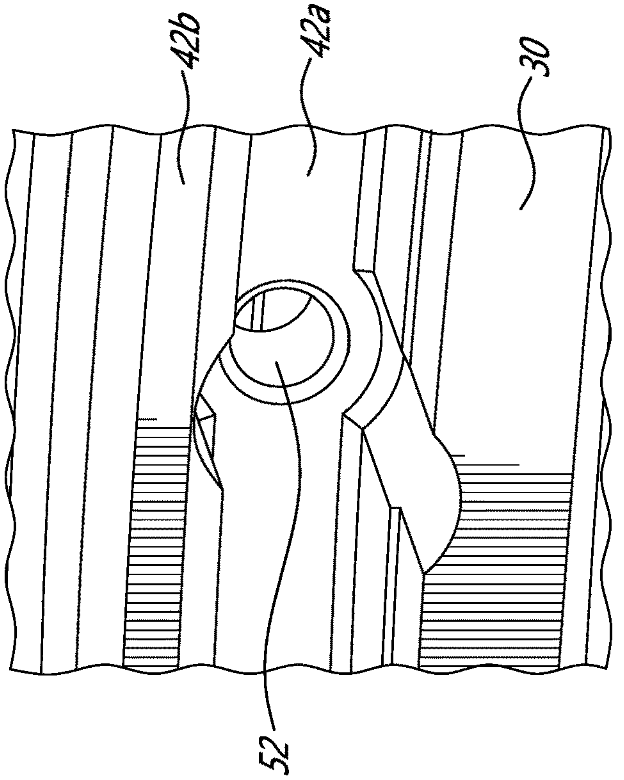
FIG. 5 is an enlarged isometric view illustrating a pin receiving hole defined in one of the hooks of the shroud segment.

FIG. 1 illustrates an aircraft engine of a type preferably provided for use in subsonic flight, and generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and a turbine exhaust case (TEC) 15 through which the combustion gases exit the engine 10. The turbine 14 includes a low pressure (LP) turbine **14*a* (also known as a power turbine) drivingly connected to an input end of a reduction gearbox (RGB) 16. The RGB 16 has an output end drivingly connected to an output shaft 18 configured to drive a rotatable load (not shown). For instance, the rotatable load can take the form of a propeller or a rotor, such as a helicopter main rotor. According to the illustrated embodiment, the compressor and the turbine rotors are mounted in-line for rotation about the engine centerline 17**.

The expressions "forward" and "aft" used herein refer to the relative disposition of components of the engine 10, in correspondence to the "forward" and "aft" directions of the engine 10 and aircraft including the engine 10 as defined with respect to the direction of travel. In the embodiment shown, a component of the engine 10 that is "forward" of another component is arranged within the engine 10 such that it is located closer to the output shaft 18. Similarly, a component of the engine 10 that is "aft" of another component is arranged within the engine 10 such that it is further away from the output shaft 18.

Figure 6:
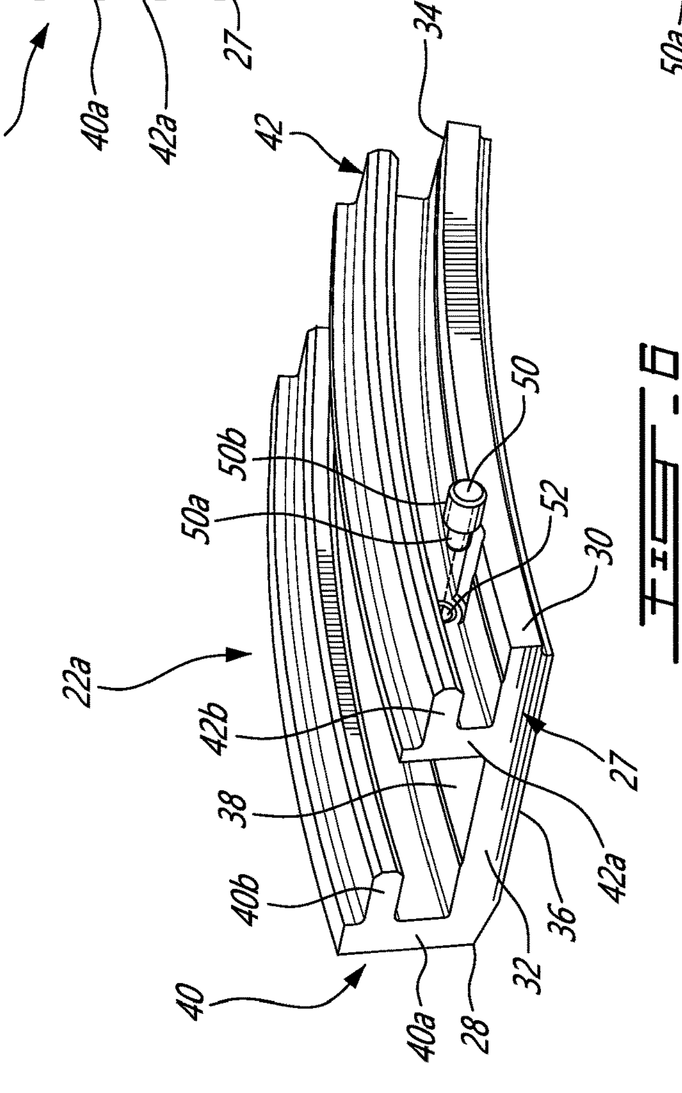
FIG. 6 is an isometric view of the shroud segment illustrating the assembly of an anti-rotation pin into a pin receiving hole defined in a radial leg portion of the aft hook of the segment.

The turbine 14 generally comprises one or more stages of circumferentially spaced-apart rotor blades 21 extending radially outwardly from respective rotor disks, with the blade tips being disposed closely adjacent to an annular turbine shroud 22 supported from a turbine shroud support 24 (FIG. 2) of a turbine support case 26. The shroud support 24 can be integral to the turbine case 26 or provided as a separate intermediate framework between the turbine case 26 and the turbine shroud 22. The turbine shroud 22 is circumferentially segmented to accommodate differential thermal expansion during operation. The shroud 22 comprises a plurality of circumferentially adjoining shroud segments 22*a* concentrically arranged around the periphery of the turbine blade tips so as to define a portion of the radially outer boundary of the engine gas path 20. The shroud segments 22*a* may be individually supported and located within the turbine support case 26 so as to collectively form a continuous shroud ring about the turbine blades 21. FIGS. 2, 3 and 6 illustrate an example of one such turbine shroud segments 22*a*.

Referring concurrently to FIGS. 2, 3 and 6, it can be appreciated that the shroud segment 22*a* has a unitary shroud body including a circumferentially arcuate platform 27 extending axially from a leading edge 28 to a trailing edge 30 relative to a hot gas flow (see flow arrows A in FIG. 2) passing through the turbine shroud 22, and circumferentially between opposite first and second lateral sides 32, 34 (FIG. 3). The platform 27 has a radially inner gas path surface 36 facing towards the axis 17 and an opposed radially outer surface 38 facing away from the axis 17. The unitary shroud body further comprises axially spaced-apart forward and aft hooks 40, 42 projecting integrally radially outwardly from the radially outer surface 38 of the platform 32. The hooks 40, 42 each have a radially extending leg portion 40*a*, 42*a* and an axially extending rail portion 40*b*, 42*b* for engagement with a corresponding hook structure of the turbine shroud support 24. According to one or more embodiments, the shroud support 24 is provided in the form of a shroud hanger integral to the turbine support case 26 (see FIG. 2). The exemplified shroud support 24 comprises forward and aft hooks projecting from a radially inner surface of the case 26 and having axially extending rail portions 24*a*, 24*b* for engagement with the corresponding rail portions 40*b*, 42*b* of the forward and aft hooks 40, 42 of the shroud segment 22*a*. The rail portions 24*a*, 24*b* define together with the radially inner surface of the turbine case 26 a pair of axially forwardly open cavities for axially receiving respective rail portions 40*b*, 42*b* of the forward and aft hooks 40, 42 of the shroud segment 22*a*. The forward and aft rail portions 24*a*, 24*b* may extend continuously along a full circumference of the turbine case 26.

According to the illustrated embodiment, the rail portions 40*b*, 42*b* of the forward and aft hooks 40, 42 of the shroud segment 22*a* project axially in an aft direction and the corresponding rail portions 24*a*, 24*b* of the shroud hanger axially project in a forward direction. However, it is understood that the axial orientation of the mating pairs of rail portions 24*a*, 40*b* and 24*b*, 42*b* could be inverted. In addition, the axial orientation of the forward and aft hooks 40, 42 does not need to be the same. Various combination/permutation are contemplated.

Referring jointly to FIGS. 2, 3, 5 and 6, it can be appreciated that the shroud segment 22*a* further comprises at least one separate anti-rotation pin 50 adapted to be pre-assembled to the unitary shroud body of the shroud segment 22*a* prior to the installation of the shroud segment 22*a* inside the turbine case 26. The term "pin" is herein intended to broadly refer to a small projection piece that projects out from a host part for engagement with a surrounding framework. For instance, the pin could be provided in the form of a peg, a tab, a fastener, etc. joined to the shroud body of the shroud segment 22*a*.

According to the example illustrated in FIGS. 2, 6, 7 and 8, the pin 50 has a cylindrical shank portion 50*a* extending axially from an enlarged head portion 50*b*. The shank portion 50*a* is engageable into a pin receiving hole 52 defined in the unitary shroud body of the shroud segment 22*a*. According to one or more embodiments, the pin 50 and the shroud body are assembled with an interference fit (also known as a press or friction fit assembly). The shank portion 50*a* of the pin 50 may be forcibly pushed into the mating hole 52 using a tap from a hammer on the head portion 50*b* of the pin 50. A thermal treatment may also be used to produce a shrink fit interference. A combination of force and thermal expansion/contraction may also be used. According to other embodiments, the pin 50 could be welded, brazed, riveted or otherwise suitably joined to the shroud body of the shroud segment 22*a*.

Figure 4:
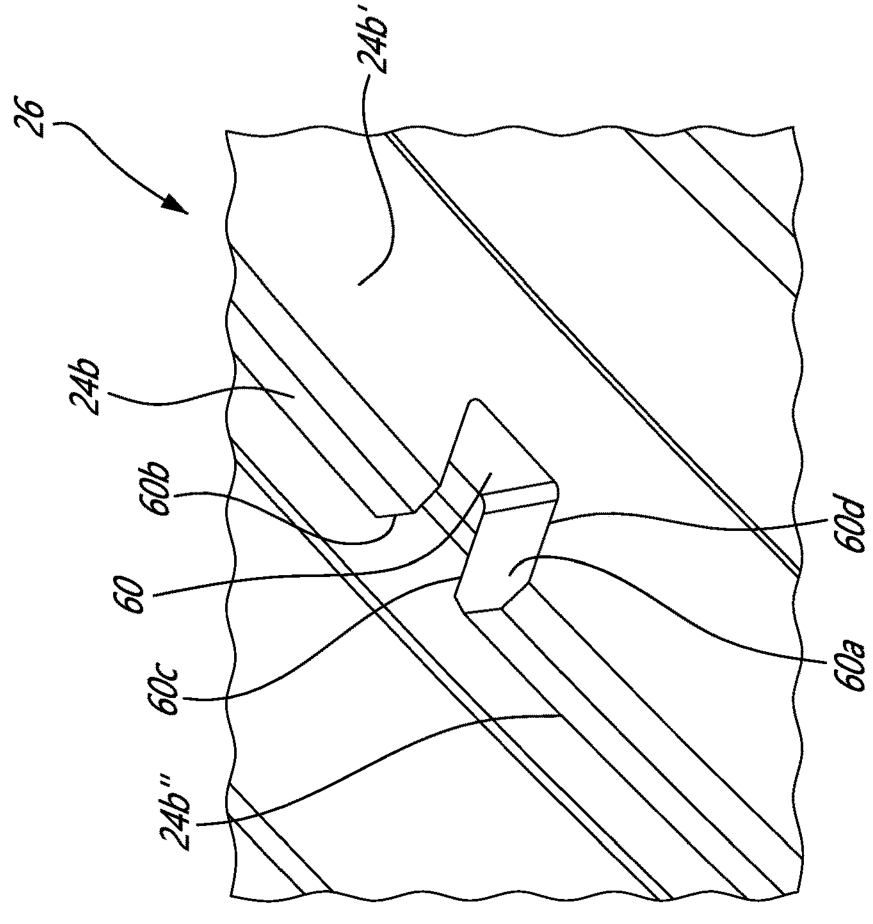
FIG. 4 is an enlarged isometric view of shroud support illustrating an anti-rotation slot configured for receiving an anti-rotation pin pre-assembled on the shroud segment.
Figure 7:
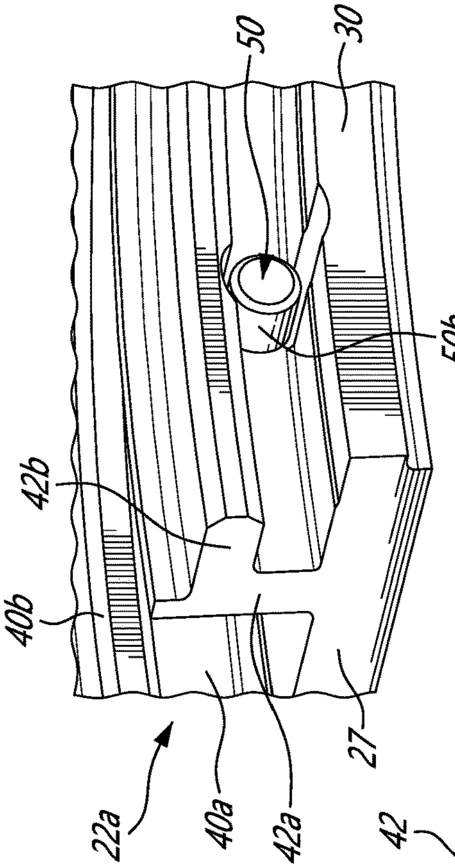
FIG. 7 is an enlarged isometric view illustrating the pin once inserted into the pin receiving hole.
Figure 8:
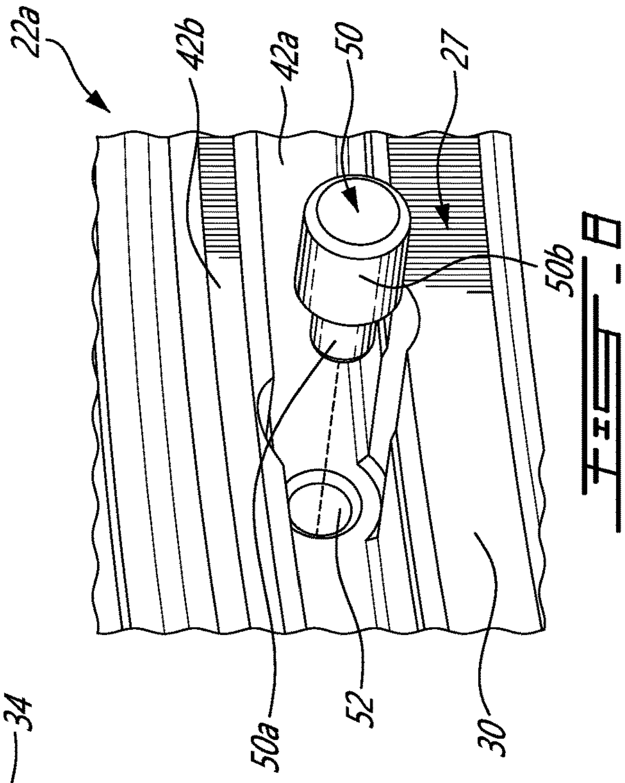
FIG. 8 is an enlarged isometric view of the pin prior to being forcibly driven into the pin receiving hole on the shroud segment.

According to one or more embodiments, the pin receiving hole 52 is defined in the radially extending leg portion 40*a*, 42*a* of one of the hooks 40, 42. In the particular example shown in FIGS. 2, 3 and 5-8, the hole 52 extends axially through the radially extending leg portion 42*a* of the aft hook 42. However, it is understood that the hole 52 could have been defined in the radially extending leg portion 40*a* of the forward hook 40 or even in another portion of the shroud body. Referring jointly to FIGS. 2-8, it can be appreciated that the hole 52 and, thus, the pin 50 are positioned radially between the platform 27 and the axially extending rail portion 42*b*. The head portion 50*b* projects from the radial leg portion 42*a* in an axially aft direction radially underneath the rail portion 42*b* for engagement with a corresponding anti-rotation/localisation abutment on the shroud support 24. For instance, the anti-rotation/localisation abutment can take the form of a slot 60 (FIG. 4) defined in the distal end or edge of the rail portion 24*b* of the aft hook of the shroud support 24. The slot 60 has a forwardly axially open end for allowing axial insertion of the head portion 50*b* of the pin 50 in the slot 60 as the shroud segment 22*a* is axially inserted in an aft direction inside the turbine case 26 via the forward open end thereof. The head portion 50*b* of the pin 50 is sized to loosely fit inside the slot 60 between the circumferentially spaced-apart sidewalls 60*a*, 60*b* thereof. The loose fit facilitates the angular alignment of the pin 50 with the slot 60 during assembly. The engagement of the head portion 50*b* of the pin 50 in the slot 60 allows to angularly locate the shroud segment 22*a* relative to the engine case 26 in a predetermined "clocking" position around the engine centerline 17 and to lock the shroud segment 22*a* against rotation relative to the engine case 26 (i.e. allows to secure the "clocking" position of the shroud segment 22*a* relative to the turbine case 26). As can be appreciated from FIGS. 2 and 4, the slot 60 extends through an entire radial thickness of the axially extending rail portion 24*b* from a radially inwardly facing surface 24*b*' of the axially extending rail portion 24*b* to the radially outwardly facing surface 24*b*" thereof. Accordingly, the slot 60 has radially opened faces 60*c*, 60*d*. That is the slot 60 is open ended in the radial direction relative to the engine axis 17 (i.e., the slot 60 is not radially bounded by any wall). Referring jointly to FIGS. 2 and 4, the person skilled in the art will thus appreciate that the pin 50 is not radially constrained in the slot 60 and is, thus, free to move radially with the shroud segment 22 relative to the shroud support 24.

As can be appreciated from FIG. 2, a forward annular crush seal band 72 is mounted in the forward rail cavity between the radially inner surface of the turbine case 26 and the radially outer surface of the rail portion 40*b* of the forward hook 40 of the shroud segment 22*a*. By mounting the pin 50 on the shroud segment 22*a* and, more particularly, by positioning the pin 50 on a radially inner side of the rail portion 42*b* of the aft hook 42 of the shroud segment, enough room is created for the positioning of an aft annular crush seal band 70 in the radial gap between the radially inner surface of the turbine case 26 and the radially outer surface of the rail portion 42*b* of the aft hook 42 of the shroud segment 22*a*. In some applications, the use of such a second crush seal band allows to improve the sealing of the shroud 22. As mentioned above, the placement of the pin 50 on the shroud segment 22*a* radially between the platform 27 and the rail portions of the hooks 40, 42 allows to use two crush seal bands, a first one on the forward hook 40 and second one on the aft hook 42.

According to one or more embodiments, individual shroud segments 22*a* are cut from a circumferentially continuous shroud ring obtained from a turning manufacturing process on a computer numerical control (CNC) machine. Such a machining process is economical compared to casting or metal injection molding (MIM) processes. Still according to one or more embodiments, the pin receiving holes 52 are machined in the individual shroud segment 22*a* either prior or after cutting of the segments. Machining the pin receiving hole 52 in the shroud segments 22*a* instead of in the turbine case 26 contributes to reduce the risk that the turbine case 26, which is a much more expensive part than the shroud segments 22*a*, be rejected for non-conformance related to this additional machining operation. Indeed, the transfer of a feature (e.g. pin receiving hole) that needs precise machining from an expensive part with limited machining access to a less expensive "sacrificial" component (e.g. shroud segment) with easier machining access as several advantages from a manufacturing point of view. Also by mounting the pins 50 of the shroud segments 22*a*, the pins 50 can be more easily replaced together with the shroud segments when need be. This contributes to minimize the operation on the turbine case 26 at overhaul and, thus, the risk of inadvertently damaging the turbine case 26.

Still according to one or more embodiments, the pins 50 are installed on the shroud segments with a tight fit assembly. This method of assembly allows the pins 50 to be removed from their respective host and replaced by a new pin if need be during maintenance operations. The pins 50 and the body of the shroud segments 22*a* can be made of a same or different material. For instance, both the pins 50 and the shroud segments 22*a* could be made of Inconel 625 or from other suitable high temperature resistant materials. While the illustrated embodiment has one pin 50 per shroud segment 22*a*, it is understood that one or more pins can be installed on each segment or selected ones of the shroud segments.

The shroud segments 22*a* with the pins 50 pre-assembled thereon are individually installed inside the turbine case 26. First, the pin 50 of a first one of the shroud segments 22*a* is angularly aligned in a circumferential direction with a corresponding one of the slots 60 in the shroud support 24 and then the first shroud segment 22*a* is axially loaded into the turbine case 26 so as to axially slide the rail portions 40*b*, 42*b* of the forward and aft hooks 40, 42 over the forward and aft rail portions 24*a*, 24*b* of the shroud support 24. Once, the first segment has been properly positioned in the turbine case 26 with its pin 50 axially engaged in the associated slot 60, a second segment is installed and the procedure is repeated until all segments have been loaded into position within the turbine case 26.

In accordance with one aspect, there is provided a shroud segment that incorporates a feature for an anti-rotation device that can be removed and replaced as required. A removable anti-rotation device that contributes to reduce the cost of the shroud segment by using a turning operation for manufacturing the shroud segments, thereby eliminating the need for traditionally more costly manufacturing methods, such as casting or metal injection molding. The provision of a separate localisation pin pre-assembled on a shroud segment removed the precision of the anti-rotation feature from the turbine case 26, which is a more expensive part to manufacture.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while the technology as been described in the context of a turboprop/turboshaft configurations, it is understood that the described shroud assembly features could be applied to other engine configuration, including turbofan and APU engines to name a few. Yet further modifications could be implemented by a person of ordinary skill in the art in view of the present disclosure, which modifications would be within the scope of the present technology.

The invention claimed is:

1. A turbine section comprising:

a turbine support case extending circumferentially around an axis;

a circumferential array of turbine blades disposed within the turbine support case for rotation about the axis; and a circumferentially segmented turbine shroud mounted inside the turbine support case about the circumferential array of turbine blades, the circumferentially segmented turbine shroud including a plurality of shroud segments disposed circumferentially adjacent to one another, each shroud segment having a body including:

a platform having a radially inner surface facing towards the axis and a radially outer surface facing away from the axis; and a forward hook and an aft hook of the platform extending radially outwardly from the radially outer surface of the platform for engagement with a shroud support structure of the turbine support case;

wherein one or more of the plurality of shroud segments have a pin receiving hole defined in the body thereof; and wherein an anti-rotation pin has a shank portion securely engaged in the pin receiving hole and a head portion loosely received in a localisation slot defined in a distal end of a rail portion of an aft hook of the shroud support structure, the head portion positioned radially between the radially outer surface of the platform and an axially extending rail portion of the aft hook of the platform.

2. The turbine section according to claim 1, wherein the pin receiving hole is defined in a radially extending leg portion of the aft hook of the platform.

3. The turbine section according to claim 2, wherein the pin receiving hole is defined in the radially extending leg portion radially between the platform and the axially extending rail portion of the aft hook of the platform.

4. The turbine section according to claim 1, wherein the shank portion of the anti-rotation pin is securely engaged in the pin receiving hole via an interference fit.

5. The turbine section according to claim 1, wherein the body is a machined body, and wherein the anti-rotation pin is pre-assembled in the pin receiving hole in a direction that is parallel to the axis.

6. The turbine section according to claim 1, wherein the pin receiving hole is machined and extends along an axial direction that is parallel to the axis.

7. The turbine section according to claim 3, wherein the head portion of the anti-rotation pin projects from the radially extending leg portion in an axially aft direction.

8. A turbine shroud assembly comprising:

a turbine support case extending circumferentially around an axis; and a circumferentially segmented turbine shroud supported by the turbine support case, the circumferentially segmented turbine shroud including a plurality of shroud segments, each shroud segment having:

a platform;

a forward hook and an aft hook of the platform projecting radially outwardly from a radially outer surface of the platform, each hook having a radially extending leg portion and an axially extending rail portion;

a pin receiving hole extending through the radially extending leg portion of the aft hook; and a pin removably installed in the pin receiving hole, the pin having a shank portion securely engaged in the pin receiving hole and a head portion loosely received in a localisation slot defined in a distal end of a rail portion of an aft hook of a shroud support structure of the turbine support case, the head portion positioned radially between the radially outer surface of the platform and the axially extending rail portion of the aft hook of the platform.

9. The turbine shroud assembly according to claim 8, wherein the pin extends along an axial direction that is parallel to the axis.

10. The turbine shroud assembly according to claim 9, wherein the head portion of the pin projects from the radially extending leg portion of the aft hook of the platform in an axially aft direction.

11. The turbine shroud assembly according to claim 10, wherein the shank portion of the pin is securely engaged in the pin receiving hole via a press or friction fit, and the head portion of the pin has a greater cross-section than the shank portion of the pin.

12. The turbine shroud assembly according to claim 9, further comprising first and second annular crush seal bands respectively encircling the axially extending rail portions of the forward and aft hooks of the platform.

13. The turbine shroud assembly according to claim 12, wherein, one of the first and second annular crush seal bands is surrounding the pin.

* * * * *